Figure 1:
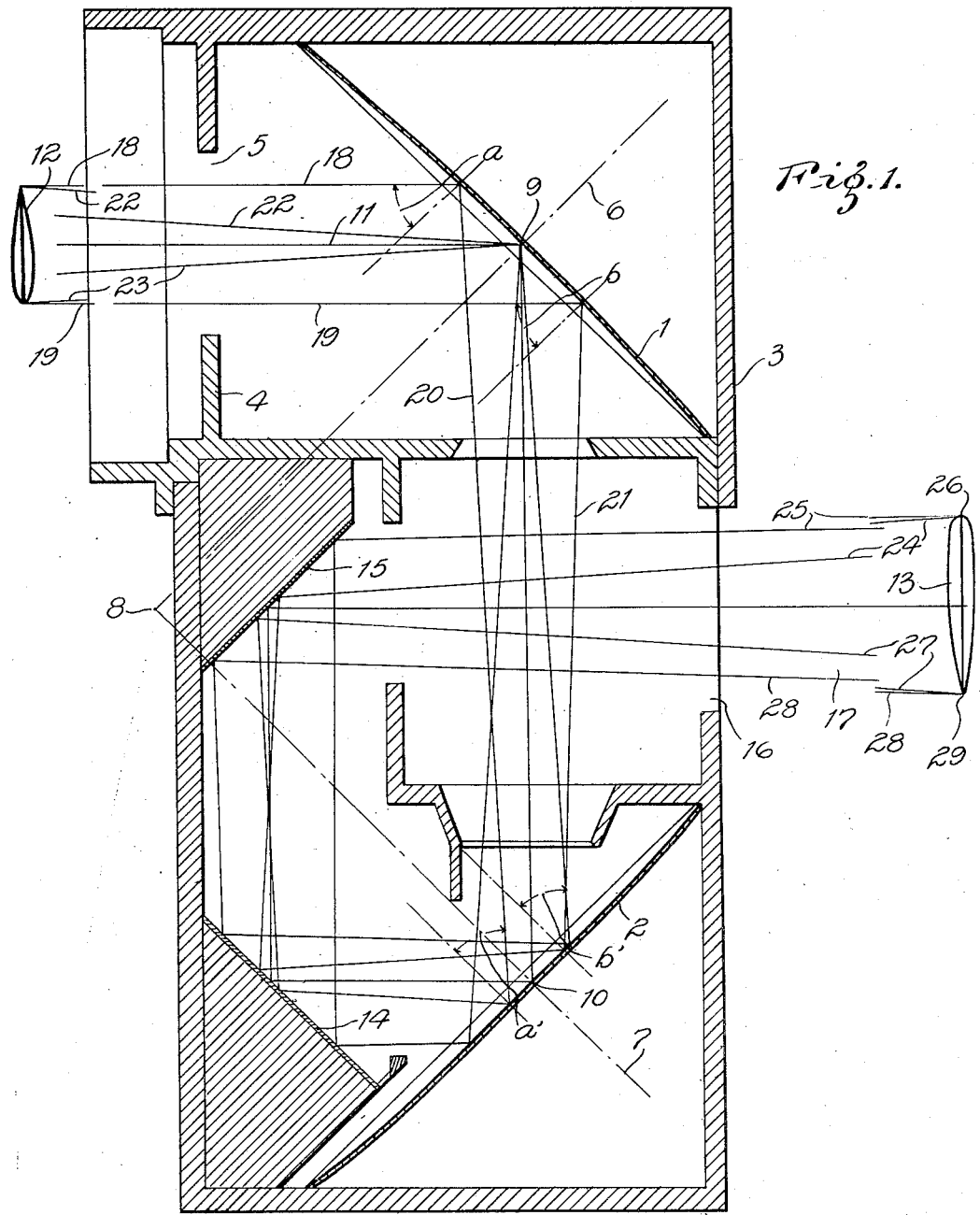

Sept. 8, 1925.

H. F. ROACH

OPTICAL INSTRUMENT

Filed July 22, 1922  2 Sheets-Sheet 2

Inventor:
Harry F. Roach.
By Elliott & Amussen
Attorneys.

Patented Sept. 8, 1925.

1,552,451

UNITED STATES PATENT OFFICE.

HARRY F. ROACH, OF ST. LOUIS, MISSOURI.

OPTICAL INSTRUMENT.

Application filed July 22, 1922. Serial No. 576,697.

*To all whom it may concern:*

Be it known that I, HARRY F. ROACH, a citizen of the United States, residing in the city of St. Louis and State of Missouri, have invented new and useful Improvements in Optical Instruments, of which the following is a specification.

In the refraction of light which occurs in the use of lenses in optical instruments, there are certain incidental difficulties such as spherical aberration, chromatic aberration etc., which develop practical problems in the construction of optical instruments and which render the production of lenses to meet definite requirements, a very expensive operation. Many corrections or special features must be used in lenses in order to overcome these difficulties, and in addition to such difficulties, there is an actual loss in efficiency, due simply to the fact that the light must pass through the glass.

It has been attempted in the past, to produce an image of an object by means of a reflecting element, but in order to produce a true image with a single reflector, it is necessary to place the object on the axis of the reflector, the result of which is that the image will be formed in a plane substantially at right angles to the same axis; hence, the presence of the object or other element or elements of optics will interfere with the passage of the reflected light rays, and in this way, a very serious practical difficulty arises. The general object of my invention is to overcome these difficulties and to provide simple means and a simple method for affecting light rays to produce useful effects solely by reflection, that is to say, without the use of a lens or lenses. However, although my apparatus and method may be practiced in this way without the use of lenses, it may be used if desired, as an adjunct to a lens or lens system. If it is attempted to utilize a reflecting element to reflect light rays from an object placed off of the axis of the reflecting element, the light rays from the object will be reflected and may be used to form an image, but such an image will not be a true image; one of the objects of my invention is to overcome this difficulty and to provide means for producing a true image with reflecting elements; also to provide a simple means and simple method for producing anamorphous images having a very high degree of magnification in one direction; also to provide simple means for producing a very highly magnified image. One of the features of my invention consists in special means which I employ to co-operate with a source of illumination in such a way as to enable the light from the point of illumination to be greatly expanded in a given plane. The invention is applicable to objective as well as to projective apparatus.

Further objects of the invention will appear hereinafter.

The invention resides in the novel features, and in the general combination of parts to be particularly described hereinafter, all of which contribute to produce a simple and efficient optical instrument. A preferred embodiment of my invention will be particularly described in the following specification, while the broad scope of my invention will be pointed out in the appended claims.

The invention also resides in the method disclosed in the specification.

In the drawing:—

Figure 2:
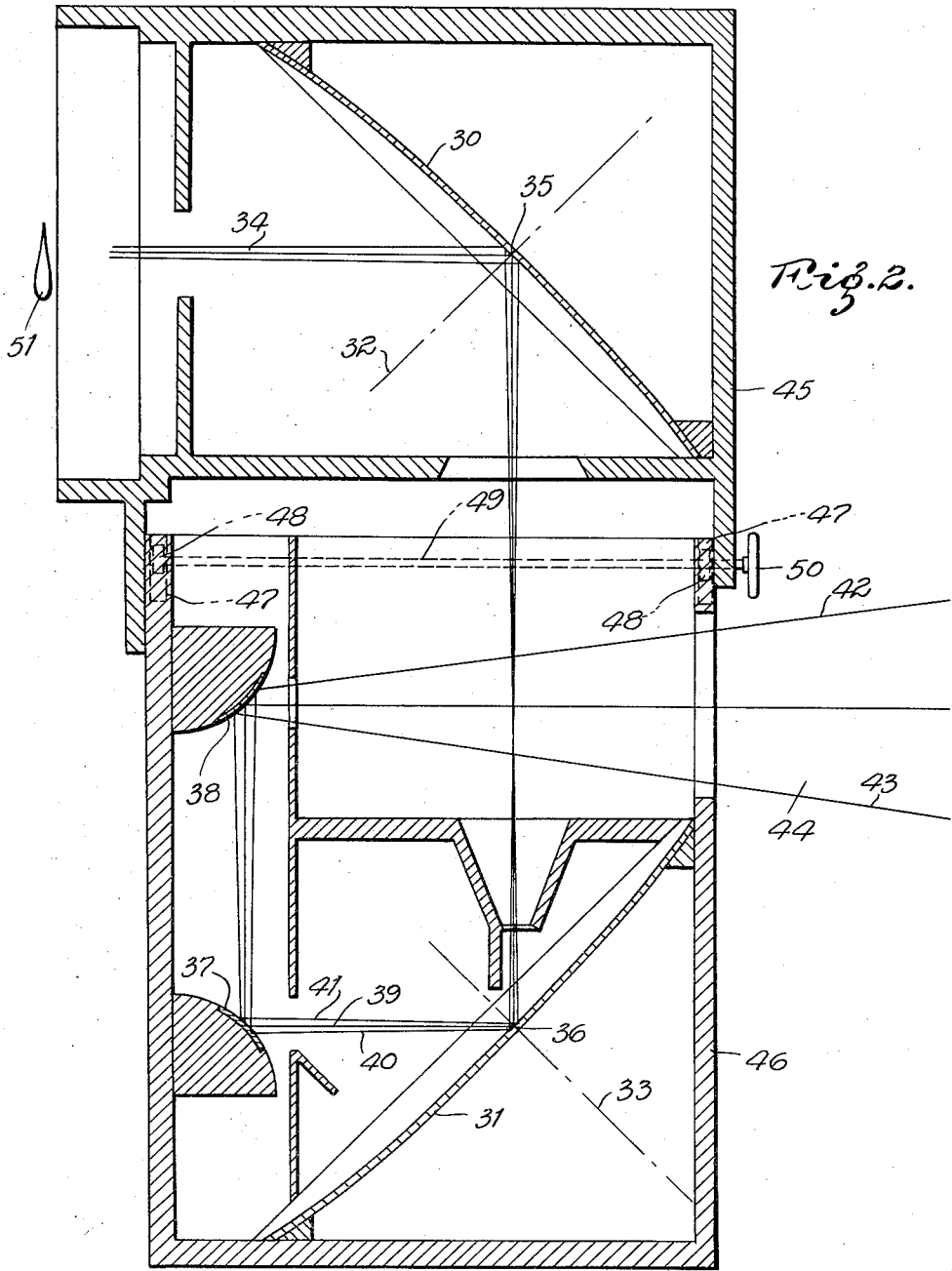

Figure 1 is a cross-section taken through simple apparatus embodying my invention and illustrating diagrammatically a manner in which the apparatus may be used to affect light rays;

Figure 2 is a view similar to Figure 1, but showing an adaptation of the invention which enables it to be used to produce special effects upon the light rays; in the present illustration, an anamorphous effect will be produced in an image. This view diagrammatically illustrates the manner in which a balancing effect may be attained in the use of my invention which will enable a normal true, or an anamorphous image to be produced.

In practicing my invention, I utilize two or more curved reflecting elements mounted so that the beam of light impinging upon one reflecting element is reflected by it upon the other, and I position the two reflecting elements in such relation to each other that they will produce a balancing effect on the rays of the light beam at the image. Hence, if desired, the two reflecting elements may be utilized to produce an image and this image will be a true image free from chromatic aberration and the other incidental defects inherent in lenses.

In order to avoid what is known as spherical aberration, which occurs in the use of spherical reflecting elements, I prefer to employ curved reflecting elements whose surfaces are ground to the shape, such as described by a conic section, for example, an ellipse, parabola or hyperbola rotated about its axis, preferably the transverse axis, thereby producing ellipsoidal, paraboloidal, or hyperboloidal surfaces, respectively, of the reflecting elements; for example, in Figure 1, I have illustrated the combination of a pair of paraboloid reflecting elements 1 and 2 which may for convenience, be mounted in a closed box 3, having means such as the stop 4 with an opening 5 operating to direct a beam of light onto the reflecting element 1. The axes 6 and 7 of the two reflecting elements are disposed in the same plane and intersect with each other at the point 8. Furthermore, the distance from the point 8 to the optical center 9 of the reflecting element 1 is equal to the distance from the intersection point 8 to the optical center 10 of the reflecting element 2, it being understood that by the term "optical center" I mean the point where the axis of the reflecting element passes through it. The use of paraboloid reflecting elements adapts the instrument for use as an objective optical instrument.

By reason of the fact that the optical centers of the two reflecting elements are equidistant from the point 8, the line 9—10 makes an equal angle with both reflecting surfaces. The direction in which the beam of light impinges upon the reflecting element 1 should be substantially at right angles to this line 9—10; that is to say, the medial axis or central ray of the beam should have the position indicated by the line 11 which may be regarded as the middle or central ray of a beam of light emitted from an object, such as a candle flame 12. Two such reflecting elements will co-operate to produce an image, but in order to produce the image at a convenient point and on the side of the box remote from the position of the object 12, it is necessary to provide means for reflecting the beam from the reflecting element 2 so as to form an image 13. In order to do this, I simply provide two plane reflectors 14 and 15 which are disposed at similar angles to the optical axis. In the illustration the mirrors are shown at right angles to each other in the box, the reflector 15 being opposite to an opening 16 through which the beam may pass onto a screen to form the image 13. The effect of the plane reflectors of course, is simply to direct the rays of the beam without in any way affecting their relation to each other.

One result of this described relation of the two reflecting elements 1 and 2, is that a balanced effect is attained in the final reflected beam 17 at the image. That is to say, of any two symmetrical rays in the incoming beam, in any plane other than one perpendicular to the reflected optical axis, lying between the curved reflecting surfaces, that ray which has the higher angle of incidence on the first reflector 1 will have the lower angle of incidence on the second reflector 2; for example, as illustrated in the figure, the lines 18 and 19 may represent two parallel rays symmetrically disposed with respect to the medial line or ray 11 and disposed in the plane in which the axes 6 and 7 lie. The angle of incidence of this ray is indicated at $a$; the ray will be reflected down in a direction indicated by the line 20 and will impinge upon the reflecting element 2 so as to have an angle of incidence indicated at $a'$. The symmetrical ray 19 will have an angle of incidence $b$ on the reflecting element 1 and will be reflected down in the direction indicated by the line 21 so that it will have an angle of incidence such as that indicated at $b'$, where it impinges upon the reflecting element 2. Now, it is evident that the angle $a$ is greater than the angle $b$, and it is also evident that the angle $a'$ is less than the angle $b'$. Hence, a ray represented by the line 18 which has the greater angle of incidence on the first reflecting element will have the smaller angle of incidence on the second reflecting element and vice versa. The ray 18 is supposed to be emitted as a parallel ray from the upper end of the candle flame 12 while the ray 19 is a parallel ray from its lower end. By using two other lines such as the lines 22 and 23 to represent two other rays from the upper end of the flame and the lower end of the flame respectively, and impinging upon the optical center 9, the direction of the reflected rays may be drawn on the figure, and they will be disposed as indicated, so that the ray 22 will finally emerge in the line 28 intersecting with a ray 27 corresponding to the ray 18. The intersection of these rays 27 and 28 will be at the lower end 29 of the image 13. In a similar manner, the resultant reflected rays 24 and 25 will correspond to the rays 19 and 23, and their intersecting point 26 will be at the top of the image 13.

The apparatus just described may be used to produce an enlarged image of the object and the degree of magnification of this image will depend upon the focal distance of the parabola or paraboloid reflecting elements 1 and 2. If desired, the apparatus shown in Figure 1 may be provided with special means for reflecting the rays which will produce a special effect in the image; for example, an anamorphous effect. However, instead of showing such means as applied to the apparatus illustrated in Figure 1, I have illustrated it as applied to the apparatus illustrated in Figure 2, which may be a projecting apparatus and in this case, the two reflecting elements 30 and 31 would be a conic section of revolution, such as ellipsoidal, but they are mounted so that their axes 32 and 33 have the same relation as that described in connection with Figure 1. In this case, also the light beam 34 is admitted so that it impinges in an inclined direction upon the optical center 35 of one of the reflecting elements, and is reflected onto the optical center 36 of the co-operating reflecting element. Instead of employing plane reflectors 14 and 15 however, I provide special means in the form of two elements 37 and 38. These reflectors are preferably convex and each element may be in the form of an elongated plate or shell, the geometrical elements of which are disposed parallel to a given fixed axis. In other words, all the cross-sections through these reflectors would have precisely the same form as those shown in Figure 2, and also the same dimensions. The reflecting surface instead of being a plain cylinder is a conic section, preferably elliptical; that is to say, the intersection of the reflecting surface with the section plane illustrated or any plane parallel to it, will be an ellipse. The beam 34 is reflected from the reflecting element 31 substantially from the optical center 36 in the form of a beam 39 which is successively reflected on the reflecting elements 37 and 38. These reflecting elements 37 and 38 also co-operate in such a way, that of two symmetrical rays in the beam, in any plane other than one parallel to a geometric axis of the curved reflecting surface cylinder that ray which has the greater angle of incidence on the element 37 will have the smaller angle of incidence on the opposite reflector 38. This will be evident by an inspection of the indicated lines of reflection of two symmetrical rays 40 and 41 which are supposed to lie in the beam 39 as reflected from the reflecting element 31. The effect of these reflectors 37 and 38 is to increase the divergence of two rays such as the rays 40 and 41 and co-operate with the reflecting elements 30 and 31 to produce an image which is a true image except for a magnification or anamorphous effect which is produced by the increasing divergence of the rays 40 and 41, for example, producing an angular relation between them, indicated by the lines 42 and 43.

By this means, I am enabled to produce an anamorphous image having a very high degree of magnification of all dimensions in one direction, or parallel with a given axis. If desired, an instrument such as that illustrated in Figure 2 may be used for enlarging photographs or for producing anamorphous images or photographs from normal photographs or objects. It is also evident that the instrument may be used to perform the functions of a microscope in which the magnification occurs in one direction. It is also obvious that by reflecting the emitted beam 44 again on two reflecting elements such as the reflecting elements 37 and 38, but disposed with their axes at right angles to the axes of the elements 37 and 38, an equal magnification could be produced in the image in a plane at right angles to that in which the first magnification occurs. When used in this way, the instrument can function perfectly as a microscope.

In order to secure the correct adjustment of the reflecting elements to aid in obtaining a true image, I prefer to provide means for adjusting the relation of the two reflecting elements 30 and 31 with respect to each other. This may simply be accomplished by having the box constructed in two telescoping sections 45 and 46 and providing racks 47 co-operating with pinions 48 carried on a cross-shaft 49 which may be rotated by a hand-wheel 50.

It will be evident that if an object such as a flame or illuminated point 51 were held so as to throw its beam of light onto the optical center 35 of the reflecting element 30, the beam from this illuminated point would be eventually reflected in the beam 44 so that the rays of light in the beam 44 would be disposed in a plane or sheet, the elementary rays of which would radiate from the reflecting element 38. This feature of the invention enables it to be employed to light up a large angular zone, for it is evident that the angle between the two outside rays such as the rays 42 and 43 may be made any angle desired. Of course, as the angle between these rays increases, it will be necessary to increase the intensity of the illumination in order to maintain the same illumination in the illuminated angular zone. Such an adaptation of the invention would be very useful in lighting up areas of the sky in zones in which the reflected rays would radiate in a vertical plane. This would enable the invention to perform the function of a large number of searchlights projecting their rays toward the sky.

While my novel method may be practiced with the apparatus illustrated, I do not limit myself in the practice of my method to the use of this apparatus. That is to say, my invention regarded as a method consists in forming an image solely by means of reflected rays from the object and thereby producing an image devoid of chromatic error. My method may also be considered as consisting in the reflection of reflected rays so as to form an image.

It will be noted that in the operation of the reflecting element 1, the beam of light is reflected away from the object. That is to say, it is reflected in a direction or line which will not pass through the object. Hence, the presence of the object does not interfere in any way with the perfect functioning of the reflecting elements. It should be understood that the image produced by the co-operation of these reflecting elements, where no special means is used for producing distortion will be an orthoscopic image.

It should also be understood that in this apparatus, the direction of the beam of light may be reversed if desired and the same instrument may be utilized as an objective or projective instrument.

It is understood that the embodiment of the invention described herein is only one of the many embodiments my invention may take, and I do not wish to be limited in the practice of my invention nor in my claims, to the particular embodiment set forth.

It should also be understood that the axes of the reflecting elements 1 and 2, 30 and 31 are the transverse or major axes of the curved reflecting surfaces.

What I claim is:—

1. Optical means comprising a pair of curved reflecting elements, whose surfaces are inclined to each other at an angle and have a shape of a conic section of revolution, one of which is positioned to receive rays and reflect them on to the other, from which latter they are in turn reflected away from the optical axis that is reflected from the first reflecting element to the second reflecting element, the rays reflected from the second reflecting element being so reflected that they lie on the same side of the optical axis reflected from the first reflecting element to the second reflecting element, as the rays impinging upon the first reflecting element, whereby a true and useful image is reflected from the second reflecting element.

2. Optical means comprising a pair of curved reflecting elements, whose surfaces are inclined to each other at an angle and have a shape of a conic section of revolution, one of which is positioned to receive light rays and reflect them on to the other, and both reflecting elements being so positioned that the angles which the respective reflecting elements make with the optical axis reflected from the first reflecting element to the second reflecting element, on the same side of said optical axis, are equal, whereby a true and useful image is reflected from the second reflecting element.

3. Optical means comprising a pair of concave reflecting elements, whose surfaces are inclined to each other at an angle and have a shape of a conic section of revolution, one of which is positioned to receive rays and reflect them on to the other, from which latter they are in turn reflected away from the optical axis that is reflected from the first reflecting element to the second reflecting element, the rays reflected from the second reflecting element being so reflected that they lie on the same side of the optical axis reflected from the first reflecting element to the second reflecting element as the rays impinging upon the first reflecting element, whereby a true and useful image is reflected from the second reflecting element.

4. Optical means comprising a pair of concave reflecting elements, whose surfaces are inclined to each other at an angle and have a shape of a conic section of revolution, one of which is positioned to receive light rays and reflect them on to the other, and both reflecting elements being so positioned that the angles which the respective reflecting elements make with the optical axis reflected from the first reflecting element to the second reflecting element, on the same side of said axis, are equal, whereby a true and useful image is reflected from the second reflecting element.

5. In an optical instrument, the combination of a pair of curved reflecting elements disposed with their axes in the same plane and intersecting each other the one being positioned to receive light rays and reflect them on to the other, said reflecting elements being at an equal distance from the point of interesection of their axes whereby a line connecting the optical centers of the elements makes equal angles with the two axes.

6. In an optical instrument, the combination of a pair of reflecting elements whose surfaces have the shape of a conic section of revolution, the one being positioned to receive light rays and reflect them on to the other, the transverse axis of each conic section of revolution constituting the axis of the reflecting element, the axes of the two reflecting elements being located in the same plane, and intersecting each other, and the reflecting elements being so positioned that the line joining the optical centers of the two reflecting elements makes equal angles with the two axes.

7. In an optical instrument, the combination of a pair of reflecting elements the one being positioned to receive light rays and reflect them on to the other, each having a transverse axis and held in a position such that a line joining the optical centers of the two reflecting elements makes an angle with one of the transverse axes equal to the angle which it makes with the other transverse axis.

8. In an optical instrument, the combination of a pair of reflecting elements whose surfaces have the shape of a conic section of revolution, one of said reflecting elements being disposed in a position to receive upon its optical center a beam of light rays passing in a given direction and reflect the same on to the optical center of the other reflecting element, the two elements having such relative positions, that the ray impinging upon the optical center of the first, and reflected from the second reflecting element, makes equal angles with the optical axis reflected from the first to the second reflecting element, said reflecting elements co-operating so that when two symmetrically disposed rays of light in the beam in any plane other than one perpendicular to the reflected optical axis lying between the curved reflecting surfaces, impinge upon the reflecting elements, that ray which has the smaller angle of incidence on the first reflecting element will have the greater angle of incidence on the second reflecting element.

9. In an optical instrument, the combination of a pair of concave reflectors whose surfaces have the shape of a conic section of revolution, one of said reflectors being disposed in a position to receive upon its optical center a beam of light rays passing in a given direction and reflect the same on to the optical center of the other reflector, the two elements having such relative positions, that the ray impinging upon the optical center of the first and reflected from the second reflecting element makes equal angles with the optical axis reflected from the first to the second reflecting element, said reflectors co-operating so that when two symmetrically disposed rays of light in the beam, in any plane other than one perpendicular to the reflected optical axis lying between the curved reflecting surfaces, impinge upon the reflectors. that ray which has the smaller angle of incidence on the first reflector, will have the greater angle of incidence on the second reflector.

10. In an optical instrument, the combination of a pair of concave reflectors whose surfaces have the shape of a conic section of revolution supported with their axes in the same plane and intersecting, the said reflectors being disposed at equal distances from the intersection of their axes, and means for directing rays of light from an object onto the optical center of one of said reflectors so that the rays are reflected from it upon the other reflector, said reflectors co-operating to produce a true image of such object, and means for adjusting the reflectors relative to each other.

11. In an optical instrument, a pair of concave reflectors, one of said reflectors whose surfaces have the shape of a conic section of revolution being disposed in a position to receive light rays from an object and reflect the same onto the surface of the other reflector, and a pair of curved reflectors, the geometrical elements of each of said last named curved reflectors being disposed substantially parallel with a given axis, said last named reflectors being disposed in a position to successively receive and reflect the light reflected by the concave reflectors and co-operating therewith to produce an anamorphous image of the object.

12. In an optical instrument, a pair of concave reflectors, one of said reflectors being disposed in a position to receive light rays and reflect the same onto the surface of the other reflector, and a pair of curved reflectors, the geometric elements of each of which are disposed substantially parallel with a given axis, said last named reflectors being disposed in a position to successively receive and reflect the light reflected by the concave reflectors.

In testimony whereof, I have hereunto set my hand.

HARRY F. ROACH.